United States Patent
Ives et al.

(10) Patent No.: US 8,754,540 B2
(45) Date of Patent: Jun. 17, 2014

(54) HYDROELECTRIC TURBINE WITH FLOATING ROTOR

(76) Inventors: James Ives, Dublin (IE); Paul Dunne, Dublin (IE)

(*) Notice: Subject to any disclaimer, the term of this patent is extended or adjusted under 35 U.S.C. 154(b) by 379 days.

(21) Appl. No.: 12/865,463

(22) PCT Filed: Feb. 5, 2009

(86) PCT No.: PCT/EP2009/000793
§ 371 (c)(1), (2), (4) Date: Oct. 5, 2010

(87) PCT Pub. No.: WO2009/098057
PCT Pub. Date: Aug. 13, 2009

(65) Prior Publication Data
US 2011/0018274 A1    Jan. 27, 2011

(30) Foreign Application Priority Data
Feb. 5, 2008  (EP) .................................. 08002074

(51) Int. Cl.
*F01D 15/10*  (2006.01)

(52) U.S. Cl.
USPC .................................. 290/52; 290/42; 290/43

(58) Field of Classification Search
USPC .................. 290/42, 43, 52–54; 415/182.1
See application file for complete search history.

(56) References Cited

U.S. PATENT DOCUMENTS

| | | |
|---|---|---|
| 228,467 A | 6/1880 | Maclay |
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

PCT International Search Report dated May 19, 2009 for International Application No. PCT/EP2009/000793, dated May 2, 2009.

(Continued)

*Primary Examiner* — Vanessa Girardi
(74) *Attorney, Agent, or Firm* — Gardner, Linn, Burkart & Flory, LLP

(57) ABSTRACT

The present invention is concerned with a hydroelectric turbine which includes a stator and a shaftless rotor housed for rotation within the stator, the stator defining an opening or channel in which the rotor is retained and which channel is dimension to permit the rotor to undergo both axial rotation and displacement along the circumference of the opening, whereby during operation the rotor assumes substantially hypocycloidal motion relative to the stator.

11 Claims, 4 Drawing Sheets

(56) References Cited

U.S. PATENT DOCUMENTS

| | | |
|---|---|---|
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 * | 9/2002 | Roseman ............... 310/90 |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,957,947 B2 | 10/2005 | Williams |
| 7,190,087 B2 | 3/2007 | Williams |
| D543,495 S | 5/2007 | Williams |
| 7,275,891 B2 | 10/2007 | Owen et al. |
| 7,352,078 B2 | 4/2008 | Gehring |
| 7,378,750 B2 * | 5/2008 | Williams ............... 290/43 |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0231072 A1 | 10/2007 | Jennings et al. |
| 2007/0291426 A1 | 12/2007 | Kasunich et al. |
| 2008/0012538 A1 | 1/2008 | Stewart et al. |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0172698 A1 | 7/2010 | Ives et al. |
| 2010/0201129 A1 | 8/2010 | Holstein et al. |
| 2010/0232885 A1 | 9/2010 | Ives et al. |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2011/0291419 A1 | 12/2011 | Dunne et al. |
| 2011/0293399 A1 | 12/2011 | Dunne et al. |
| 2011/0298216 A1 | 12/2011 | Ives et al. |
| 2011/0304148 A1 | 12/2011 | Dunne et al. |
| 2012/0027522 A1 | 2/2012 | Ives et al. |
| 2012/0175877 A1 | 7/2012 | Ives et al. |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878911 A | 1/2008 |
| EP | 1878912 A | 1/2008 |
| EP | 1878913 A | 1/2008 |
| EP | 1879280 | 1/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |

(56) References Cited

FOREIGN PATENT DOCUMENTS

| | | |
|---|---|---|
| GB | 1413835 | 11/1975 |
| GB | 2316461 | 2/1998 |
| GB | 2344843 | 6/2000 |
| GB | 2408294 | 2/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | WO03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | WO2010118766 | 10/2010 |
| WO | WO2011039249 | 4/2011 |
| WO | WO2011039255 | 4/2011 |
| WO | WO2011039267 | 7/2011 |

OTHER PUBLICATIONS

PCT Written Opinion of International Searching Authority (May 19, 2009).

PCT Request for Processing of International Application (Feb. 5, 2009).

U.S. Appl. No. 13/133,235, filed Jun. 7, 2011, including the specification, claims and drawings.

U.S. Appl. No. 13/133,805, filed Jun. 9, 2011, including the specification, claims and drawings.

U.S. Appl. No. 13/133,504, filed Jun. 8, 2011, including the specification, claims and drawings.

U.S. Appl. No. 13/133,507, filed Jun. 8, 2011, including the specification, claims and drawings.

U.S. Appl. No. 13/133,832, filed Jun. 9, 2011, including the specification, claims and drawings.

U.S. Appl. No. 13/264,667, filed Oct. 14, 2011, including specification, claims and drawings.

\* cited by examiner

HYDROELECTRIC TURBINE WITH FLOATING ROTOR

FIELD OF THE INVENTION

The present invention is concerned with a hydroelectric turbine having a stator and a shaftless rotor, the rotor being housed for rotation within the stator and being permitted to undergo substantially hypocycloidal motion within the stator.

BACKGROUND OF THE INVENTION

This invention relates generally to the field of turbines that produce electricity by harnessing the flow of water, and more particularly relates to such devices wherein tidal flow of water causes rotation of a large impellor-type rotor having an annular outer rim disposed within a large annular housing.

While most turbines are constructed to have a central rotating shaft onto which the blades or runners are mounted, it is also known to produce open-centered turbines, also known as rim-mounted turbines. Turbines having open-centered rotors, where the blades are mounted between inner and outer annular rings or rims and where the energy is transferred through the outer rim to an annular housing that retains the rotor, can be particularly successful in low head conditions, i.e., in slower currents.

Examples of open center, rim-mounted turbines can be seen in U.S. Pat. No. 5,592,816 issued Jan. 14, 1997, and reissued as RE38,336 on Dec. 2, 2003, U.S. Pat. No. 6,648, 589 issued Nov. 18, 2003, U.S. Pat. No. 6,729,840 issued May 4, 2004, and U.S. Patent Appl. Publication US2005/0031442 published Feb. 10, 2005 (Ser. No. 10/633,865). Examples of hydroelectric turbines used in low head (tidal flow) conditions can be seen in U.S. Pat. No. 4,421,990 to Heuss et al., U.S. Pat. Nos. 6,168,373 and 6,406,251 to Vauthier, UK Patent Appl. No. GB 2,408,294 to Susman et al., and WIPO International Publication WO 03/025385 to Davis et al.

Liquid powered turbines are seen as environmentally safe replacements for electrical power plants that utilize fossil fuels or atomic energy. In harnessing water to produce electricity on a large scale capable of powering industrial complexes, towns, cities, etc., it is necessary to provide large numbers of turbines, and it is necessary that the turbines be as large as practical in order to maximize the amount of electricity produced by each turbine. The rotor blades of these turbines are multiple meters in length, with some experimental designs having blades exceeding 50 meters in length.

As the length of the rotor blades is increased, structural and manufacturing challenges are presented that are not encountered in smaller turbines or generators. For shaft-mounted turbines, it is difficult to provide long blades that are both strong and light. In one solution, the blades of the shaft-mounted turbine are provided with an outer annular rim, which is contained within an annular housing, thereby providing support to the blades through the shaft and the rim. Alternatively, rim-mounted turbines with no central shaft provide a solution to this problem by providing annular support to the inner and outer ends of the blade, with the outer support rim being retained within a housing having an annular slot or channel. In a typical means for generation of electrical power, a large number of magnets are spaced along the annular support rim and a large number of coils are spaced along the receiving channel in the stator housing. The magnetic field established by the rotor field system passes across the gap that separates the rotor and the stator. Rotation of the rotor causes the magnetic flux linkage with the coils to change, inducing an electro-magnetic force in the coils.

Because the annular outer rim of the rotor is received within a channel in the stator housing, liquid-borne debris may be captured within the channel. Any significant accumulation of debris will interfere with rotation of the rotor and may cause damage. The accumulation of debris may be most problematic in low head conditions, such as with a tidal flow generator, since it is easier for debris to settle into the housing channel from the relatively slow moving water.

It is an object of this invention to provide an improved structure for a turbine having an annular outer rim disposed on the rotor blades, the outer rim being retained within a channel disposed in the stator, such that the start-up friction on the bearings of the turbine is reduced, and such that during use the bearings are cleaned and cooled in order to provide improved performance.

SUMMARY OF THE INVENTION

The present invention therefore provides a hydroelectric turbine comprising a stator and a shaftless rotor, the stator defining an opening in which the rotor is housed for rotation; characterized in that the opening is shaped and dimensioned to permit the rotor to undergo rotation about a central axis of the rotor and displacement along the circumference of the opening in a direction opposite to that in which the rotor is rotating.

Preferably, the opening is shaped and dimensioned to permit the rotor to undergo substantially hypocycloidal motion.

Preferably, the turbine comprises a rim based generator comprising an array of coils on the stator and a corresponding array of magnets on the rotor.

Preferably, the turbine comprises a set of bearings supporting the rotor within the stator, the bearings comprising an array of bearing units on one or other of the stator and rotor and a corresponding journal on the other of the stator and rotor.

Preferably, the bearing units are designed to undergo wear during use.

Preferably, a gap is provided between adjacent bearing units.

Preferably, the turbine comprises at least one sensor embedded in a corresponding at least one bearing unit and adapted to signal a predetermined level of wear of the bearing unit.

Preferably, the set of bearings is positioned to be exposed to open water during operation of the turbine.

Preferably, the rotor is at least partially comprised of a buoyant material.

Preferably, the stator comprises an annular channel which defines the opening and within which the rotor is retained for rotation.

Preferably, the rotor comprises an open centre.

Preferably, the rotor and stator are adapted to allow the rotor to undergo bi-directional rotation.

As used herein, the term "axial rotation" is intended to mean the rotation of a body, for example a rotor of a hydroelectric turbine, about a longitudinal axis of the body.

As used herein, the term "displacement" is intended to mean the movement or displacement of a body, for example a rotor of a hydroelectric turbine, along a path, for example a curved or circular path.

As used herein, the term "hypocycloidal" is intended to mean the motion of one rotating body within a substantially circular opening whose diameter is larger than the outer diameter of the rotating body, whereby the rotating body is permitted to rotate about it's own central axis while simultaneously travelling around the circumference of the opening.

DETAILED DESCRIPTION OF THE DRAWINGS

Referring now to the accompanying drawings there is illustrated a hydroelectric turbine according to a preferred embodiment of the present invention, generally indicated as 10, which is adapted to provide improved operation by virtue of the novel motion of the components thereof during use. The turbine 10 comprises a stator 12, which in use is fixed, for example to the seabed, and a rotor 14 which is constrained for rotation within the stator 12, as will be described in detail hereinafter.

Figure 3:
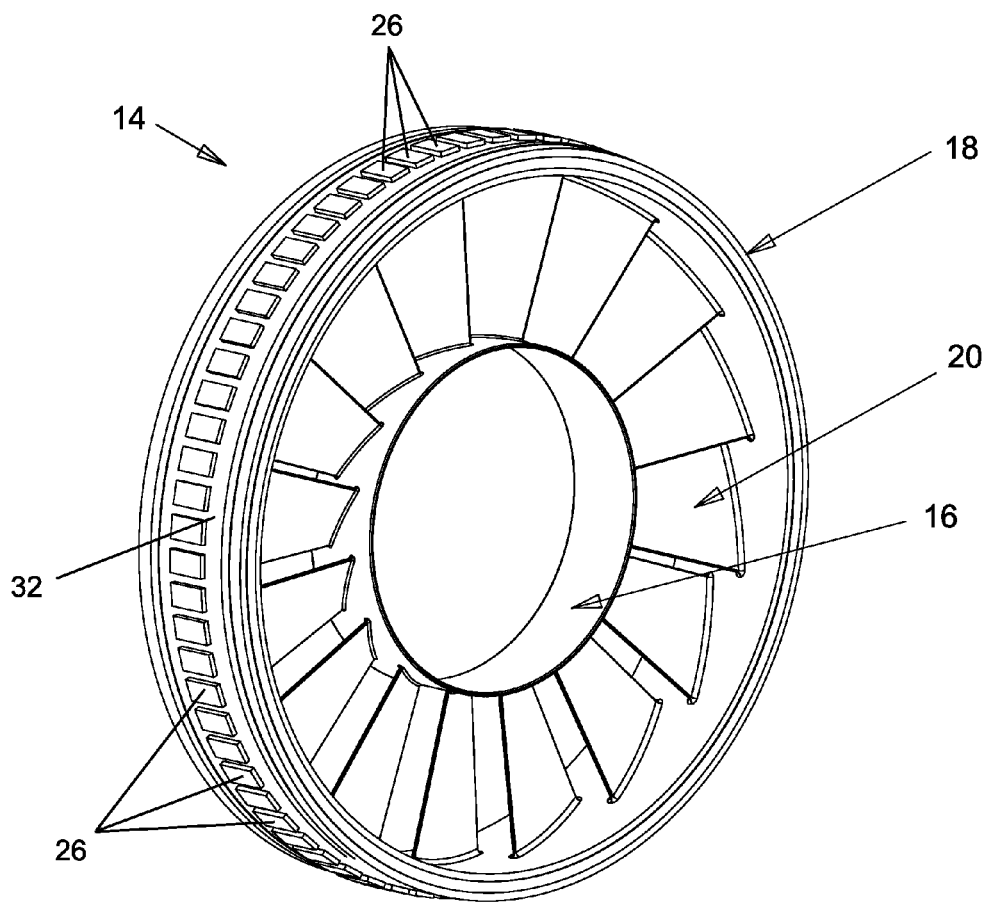
FIG. 3 illustrates a perspective view of a rotor forming part of the turbine of FIG. 1.

The rotor 14, as illustrated in FIG. 3, comprises a substantially circular inner rim 16, defining an open centre, a substantially circular outer rim 18, and an array of blades 20 fixed between the inner and outer rims 16, 18. It will however be appreciated from the following description of the operation of the turbine 10 that the configuration and/or number of blades 20, and the provision of the inner rim 16 are not essential to the operation of the invention, and could be modified while still retaining the functionality of the invention.

Figure 1:
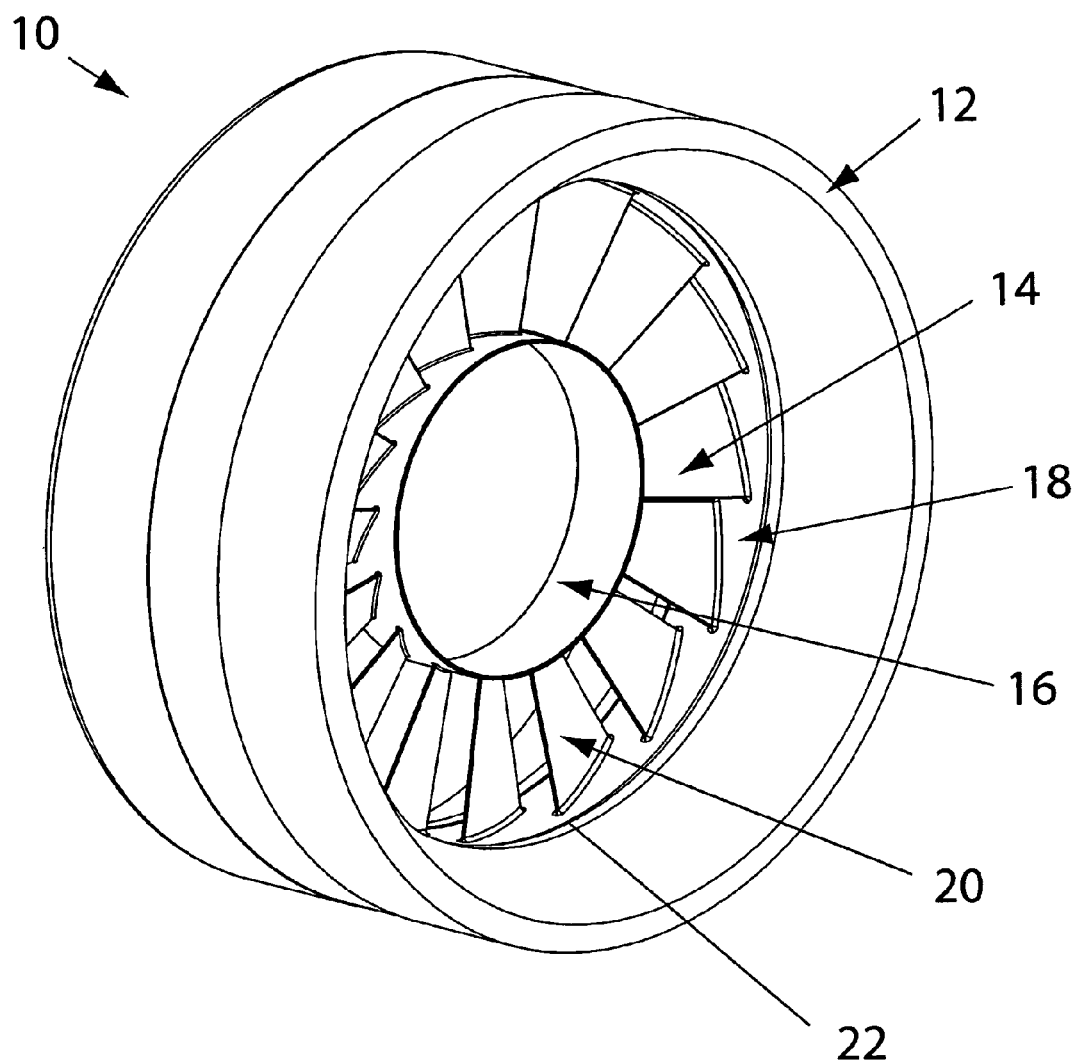
FIG. 1 illustrates a perspective view of a hydroelectric turbine according to a preferred embodiment of the present invention.
Figure 2:
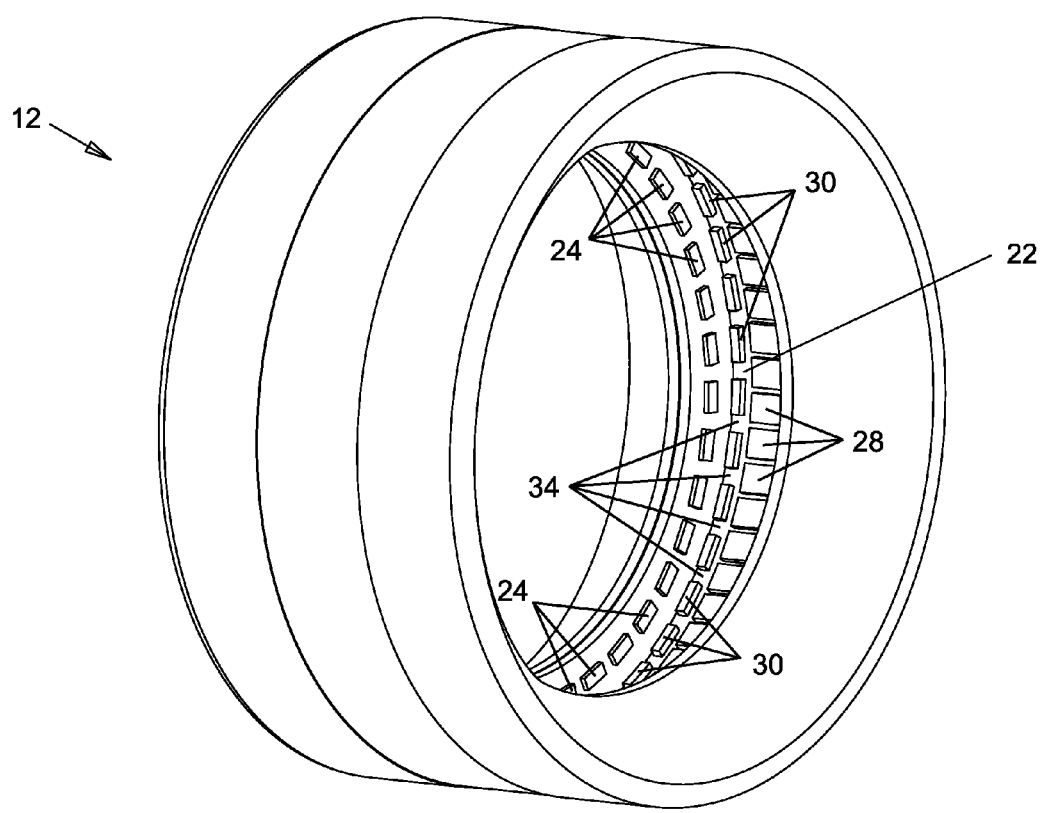
FIG. 2 illustrates a perspective view of a stator forming part of the turbine of FIG. 1.

Referring to FIG. 2, in the preferred embodiment illustrated the stator 12 defines an opening in the form of a substantially annular channel 22 within which, in use, the outer rim 18 of the rotor 14 is located, as illustrated in FIG. 1. The width of the channel 22 is dimensioned to receive the outer rim 18 therein while preventing unwanted fore/aft movement of the rotor 14 in response to tidal flow therein, the channel 22 preferably being provided with mechanical and/or magnetic bearings 24 to retain the rotor 14 in the axial direction. As illustrated in FIGS. 2 and 3, the turbine 10 is provided with a rim based generator which includes as essential components an array 26 on outer rim 18 and a corresponding array 28 in channel 22 in which the arrays 26, 28 comprise an array of coils provided on one or the other of the outer rim 18 and channel 22 and a corresponding array of magnets provided on the other of the outer rim 18 and channel 22. In use as the rotor 14 rotates in response to tidal flow therepast, the above-mentioned magnets and coils move relative to one another thereby generating a current in each of the coils in known manner.

Figure 4:
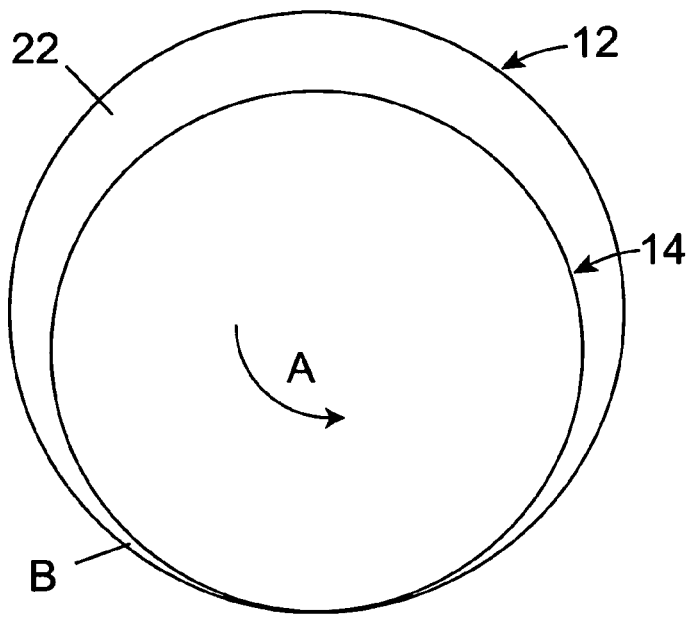
FIG. 4 illustrates a sectioned side view of the turbine of FIG. 1.

Referring now to FIG. 4 in order to reduce friction in the radial direction between the rotor 14 and the stator 12, a set of bearings is provided in the form of an array of bearing units 30 within the channel 22 and a journal 32, for example of stainless steel or the like, wrapped around the outer rim 18. The bearing units 30 may be in the form of conventional bearing blocks, rollers, or any other suitable functional equivalent. It will also be appreciated that the individual bearing units 30 could be formed by machining grooves at intervals around a continuous circumferential bearing in order to effectively define individual bearing units or blocks having gaps 34 there between. The opening defined by the channel 22 in which the outer rim 18 is located is shaped and dimensioned, with the bearing units located therein, to permit the rotor 14 to undergo non-concentric rotation within the channel 22 as described in detail hereinafter.

Figure 5:
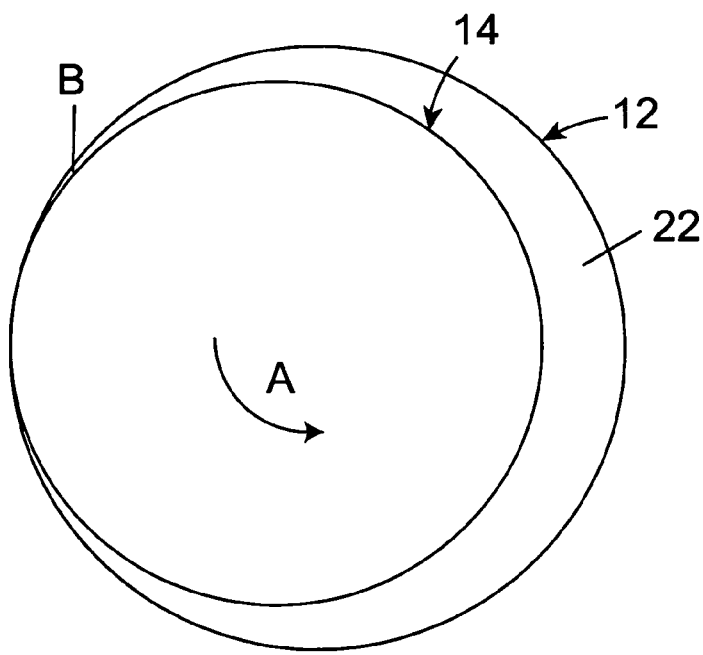
FIG. 5 illustrates the sectioned side view of FIG. 4 with a rotor of the turbine in an advance position relative to that of FIG. 4.

Due to the oversize diameter of the channel 22 relative to the rotor 14, the outer rim 18, or more particularly the journal, only contacts a small arc of the bearing units at any one time and thus the remaining bearing units are exposed to the open water flowing through the turbine 10. On start up, due to the static weight of the rotor 14 the journal will contact the lower most bearing units on the stator 12. However if the rotor 14 is buoyant then this may not be the case. For example, if the rotor 14 were more than neutrally buoyant it would when static be in contact with the upper most bearing units on the stator 12 and would exert an upward thrust on the stator 12. However, regardless of the buoyancy of the rotor 14, as the tide begins to flow therethrough the rotor 14 will start to rotate about its central axis. However as the rotor 14 spins on its axis it will as a result gradually move its way around the channel 22 in a direction opposite to that in which the rotor 14 is rotating. Thus for example if the tidal flow is such that the rotor 14 is rotating on it's axis in a counterclockwise direction as indicated by arrow A in FIG. 4, the contact between the journal and the bearing units will result in the rotor 14 moving or drawing itself in a clockwise direction around the circumference of the channel 22. Referring to FIG. 5, it can be seen that the rotor 14 has drawn itself into a position approximately a quarter of the way around the circumference of the channel 22 relative to the starting position illustrated in FIG. 4. While there will be significant slippage between the journal and the bearing units, the combined motion of the rotor 14 most closely approximates hypocycloidal motion, and is hereinafter referred to as "substantially hypocycloidal motion". In order to permit this substantially hypocycloidal motion it will be appreciated that while the open centre defined by the inner rim 16 is not essential, it is necessary that the rotor 14 is not mounted on a central shaft as this would constrain the rotor 14 to rotation about the shaft and would not allow the rotor 14 to move around the circumference of the channel 22.

It will be appreciated that as the tide reverses the rotor 14 will now spin in the opposite direction on it's axis, and as a result will move or draw itself around the circumference of the channel 22 also in the opposite direction. During the period when the tide is turning and as a result the rotor is undergoing little or no spinning on it's axis the rotor 14 may again settle downwardly towards the bottom of the channel 22 as illustrated in FIG. 4.

The substantially hypocycloidal motion of the rotor 14 results in a number of advantages during operation of the turbine 10. As the rotor 14 contacts only a small number of the bearing units 30 at any one time, the remaining bearing units are exposed to the tidal flow of water through the turbine 10, thereby allowing these bearing units 30 to be both cooled by the flowing water and flushed of any debris or the like, which may accumulate on or between the bearing units 30. As the rotor 14 moves around the channel 22 each of the bearing units 30 will be sequentially exposed to the open water, thereby allowing the cooling and cleaning of all of the bearing units 30 in turn. In addition, the configuration of the rotor 14 within the larger diameter channel 22 results in a gap between the rotor 14 and channel 22 which tapers downwardly towards the area of contact between the rotor 14 and the bearing units 30. As a result in the space labeled as B between the journal and bearing units 30, directly upstream of the point of contact therebetween with respect to the direction of rotation of the rotor 14, the water in the channel 22 will be compressed as it is driven towards and into the area of contact between the journal and the bearing units 30. This pressurization of the water in the space B will create a hydrodynamic effect between the bearing units 30 and the journal at the contact location, thereby reducing the friction between the rotor 14 and the stator 12. In order to promote the hydrodynamic effect the contact face of each bearing pad may be contoured or otherwise modified to maximize the hydrodynamic effect.

By providing an oversized opening defined by the channel 22, relative to the rotor 14, in order to permit the above described substantially hypocycloidal motion, the turbine 10 is rendered tolerant to thermal expansion/contraction and flexing or deformation due to tidal forces experienced thereby. In any given site of operation, the turbine 10 is likely to experience temperature differences, which will result in thermal expansion/contraction of the stator 12 and the rotor 14. In addition, the significant forces exerted by tidal flow on the turbine 10 will result in some flexing or deformation of the turbine 10, and in particular the rotor 14. The over sizing of the channel 22 relative to the rotor 14 will allow both the thermal expansion/extraction and deformation of the turbine 10 without resulting in binding or braking/slowing of the rotor 14 within the stator 12.

As described above, the turbine 10 is provided with a rim based generator, having a plurality of coils and corresponding plurality of magnets disposed on one or the other of the outer rim 18 and channel 22, as shown by arrays 26 and 28. As the rotor 14 rotates the relative motion between the coils and magnets results in the generation of electricity. The magnetic field of the magnets extends across the water gap between the rotor 14 and the stator 12 in order to cut through the coils and induce a current therein. As the gap varies in dimension around the circumference of the rotor 14 and channel 22, so too will the strength of the magnetic field cutting through the respective coils. The greater the water gap the lower the magnetic field strength cutting through the coils and therefore the lower the current induced in those coils. Thus there will be variations in the current generated by the individual coils disposed about the turbine 10 as the rotor 14 moves around the circumference of the channel 22. It is thus preferable that the current from each coil is rectified prior to being combined, as combining DC currents in this manner is far less problematic than the combination of varying AC currents. Thus, in a most preferred embodiment of the turbine 10, each of the coils is provided with means for rectifying the current induced therein, and preferably in the form of a dedicated rectifier provided adjacent each coil.

As each of the bearing units 30 are continuously cooled and cleaned during use, they will experience less wear. However, the bearing units 30 will nevertheless experience some wear. The operation of the turbine 10 is nevertheless tolerant of such wear, which will simply result in a slight increase in the circumference of the path along which the rotor 14 travels around the channel 22 and will not result in a loose or ill-fitting rotor 14 as would be the case with a conventional concentrically rotating rotor constrained within a traditional set of bearings. The turbine 10 may nevertheless be provided with one or more wear sensors (not shown) imbedded within one or more of the bearing units 30 at a pre-determined depth. In this way, once the bearing unit 30 is worn down to the sensor (not shown), a signal may be generated which will indicate that the bearing units 30 have been worn to a point at which repair or replacement is required.

It will therefore be appreciated that the design of the turbine 10, in allowing the rotor 14 to undergo substantially hypocycloidal motion, provides a number of significant advantages over conventional arrangements, in particular the cooling and cleaning of the bearings.

The invention claimed is:

1. A hydroelectric turbine comprising a stator and a shaftless rotor, the stator defining an opening in which the rotor is housed for rotation; a set of bearings supporting the rotor within the stator, the bearings comprising an array of bearing units on one or the other of the stator and rotor and a corresponding journal on the other of the stator and rotor; wherein the opening is shaped and dimensioned such that the journal only contacts a small arc of the bearing units at any one time to permit the rotor to undergo rotation about a central axis of the rotor and displacement along the circumference of the opening in a direction opposite to that in which the rotor is rotating.

2. A hydroelectric turbine according to claim 1 in which the opening is shaped and dimensioned to permit the rotor to undergo substantially hypocycloidal motion.

3. A hydroelectric turbine according to claim 1 comprising a rim based generator comprising an array of coils on the stator and a corresponding array of magnets on the rotor.

4. A hydroelectric turbine according to claim 1 in which the rotor is at least partially comprised of a buoyant material.

5. A hydroelectric turbine according to claim 1 in which the stator comprises an annular channel which defines the opening and within which the rotor in retained for rotation.

6. A hydroelectric turbine according to claim 1 in which the rotor comprises an open centre.

7. A hydroelectric turbine according to claim 1 in which the rotor and stator are adapted to allow the rotor to undergo bi-directional rotation.

8. A hydroelectric turbine according to claim 1 comprising a set of bearings supporting the rotor within the stator, the bearings comprising an array of bearing units on one or other of the stator and rotor and a corresponding journal on the other of the stator and rotor.

9. A hydroelectric turbine according to claim 8 in which the bearing units are designed to undergo wear during use.

10. A hydroelectric turbine according to claim 8 in which a gap is provided between adjacent bearing units.

11. A hydroelectric turbine according to claim 8 in which the set of bearings is positioned to be exposed to open water during operation of the turbine.

* * * * *